United States Patent [19]
Jacobs

[11] 3,807,793
[45] Apr. 30, 1974

[54] BICYCLE SEAT

[76] Inventor: David L. Jacobs, 2355 Canyon Blvd., Suite 101, Boulder, Colo. 80302

[22] Filed: Feb. 9, 1972

[21] Appl. No.: 224,884

[52] U.S. Cl. .............................................. 297/214
[51] Int. Cl. ................................................ B62j 1/18
[58] Field of Search ............ 247/214; 297/200, 214, 297/252–256, DIG. 1; 5/341

[56] References Cited
UNITED STATES PATENTS

| | | | |
|---|---|---|---|
| 2,725,927 | 12/1955 | Feinerman | 5/341 |
| 3,588,171 | 6/1971 | Rich, Jr. | 297/214 |
| 2,314,046 | 3/1943 | Kalter | 297/200 |
| 3,521,385 | 5/1968 | Daleboht | 36/2.5 AL |
| 3,388,946 | 6/1968 | Grade | 297/214 |
| 3,416,838 | 12/1968 | Mesinger | 297/214 |
| 3,586,369 | 6/1971 | Worley | 297/195 |
| 3,604,748 | 9/1971 | Lamkemeyer | 297/214 |
| 3,708,201 | 1/1973 | Lamkemeyer | 297/214 |

Primary Examiner—Paul R. Gilliam
Attorney, Agent, or Firm—John J. Byrne

[57] ABSTRACT

A compartmented bicycle seat padding adapted to be secured to bicycle seat wherein said padding is enclosed by an outer leather-like exterior and the compartments of said padding receives a formable, stable, dilatant or thixotropic padding material of said padding such as polybutadiene.

6 Claims, 4 Drawing Figures

PATENTED APR 30 1974 3,807,793

BICYCLE SEAT

This invention relates to a bicycle seat and more particularly to a bicycle seat constructed and arranged for maximum comfort and durability.

A principal objective of this invention is to provide a padding for a bicycle seat which has the ability to form to the shape of the body in contact therewith and at the same time be comfortable and giving maximum support when needed. At the present time many bicycle seats include a tubular frame supporting a leather or molded plastic shell. In some instances, especially in general purpose bicycles, a sponge-like padding material is disposed under the outer plastic or leather lining. However, in high performance bicycle seats the padding has been kept to a minimum for several reasons. First of all, the user usually desires form contact with the seat as excessive movement causes abrasions and soreness. If a soft sponge padding is utilized, the continuous movement of the body allowed by the sponge causes a loss of positive driving force to the pedals. Some of the force is lost in the up and down compression of the sponge.

Points of pressure normally exist where the pad contacts the user's pelvic bones. Therefore, another feature of the present invention is to provide a unique pad material which provides conformability to a particular pelvis configuration of a user and which will retain that shape between usages.

A still further objective of this invention is to provide a bicycle wherein a thixothropic or dilatant material is utilized as the padding therefore and this padding is enclosed within a series of compartments to maintain a particular amount in the desired areas.

Another important objective of this invention is to provide an inner-container of a flexible non-leaking material such as polyethylene for preventing any oil leakage from the padding material. A still further ojective of this invention is to provide the above-mentioned compartmented sections by way of heat seals between the upper and lower layers of the polyethylene.

Another objective of this invention is to provide a polyurethane or any leather-like material to cover the container and wherein the leather-like material is stitched together along heat seals which divide the aforementioned into compartments. A still further objective of this invention is to provide each of the said compartments with an opening to receive a foam rubber material which can conform to the shape of the user in contact with the seat.

A further objective of the invention is to provide a method of making a seat having many of the aforementioned characteristics and advantages.

These and other objects of the invention will become more apparent to those skilled in the art by reference to the following detailed description when viewed in light of the accompanying drawings wherein.

Figure 1:
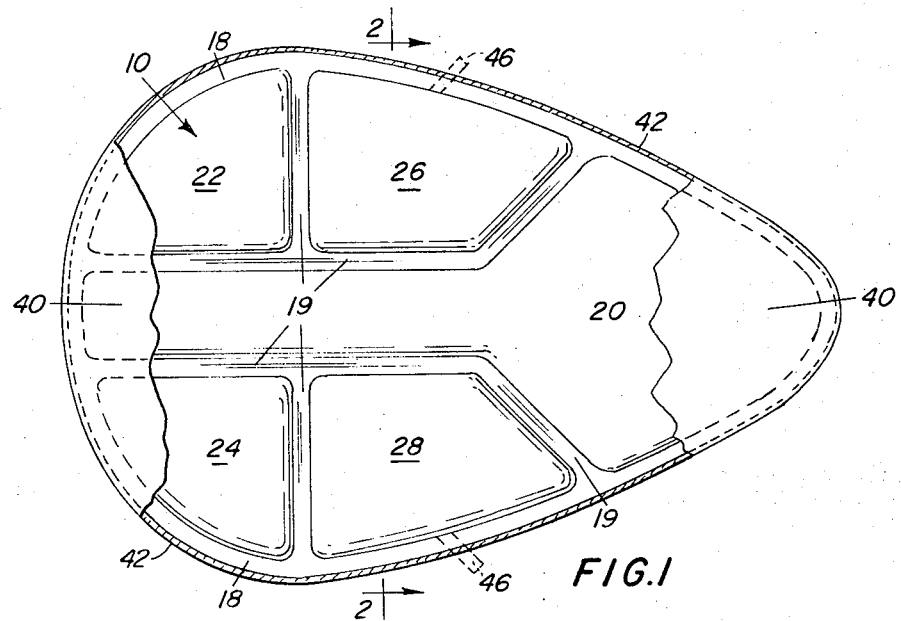
FIG. 1 is a top plan view of a pad made in accordance with this invention.
Figure 2:
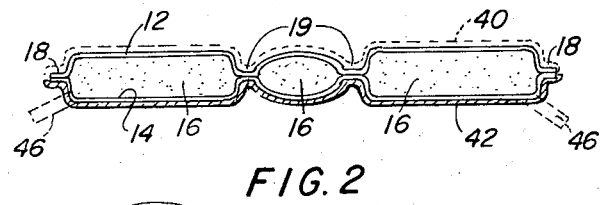
FIG. 2 is a cross-section view along the line 2—2 of FIG. 1.
Figure 3:
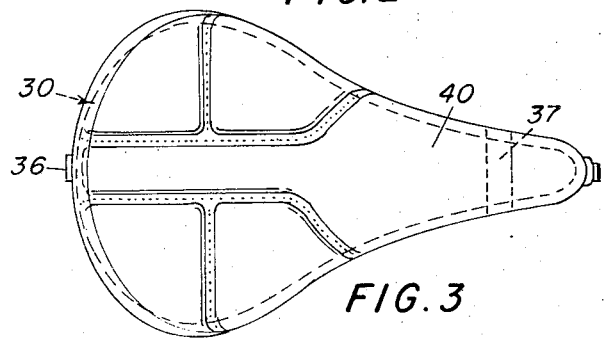
FIG. 3 is a top plan of the pad of FIG. 1 applied to a bicycle seat.
Figure 4:
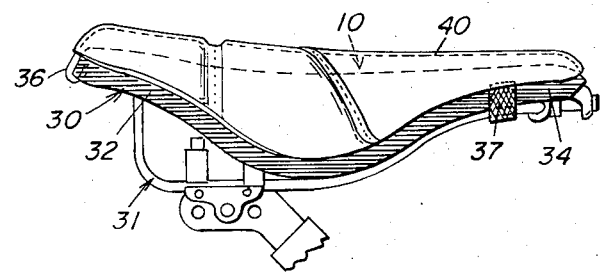
FIG. 4 is a side elevation view of the assembly of FIG. 3.

Referring now to the drawings wherein like numerals indicate like parts, numeral 10 indicates a pad made in accordance with this invention. The pad is enclosed within upper and lower sheets of polyethylene 12 and 14 in which a padding material 16 is enclosed. The polyethylene sheets are heat sealed about their peripheries as indicated by the numeral 18. Other heat seals, generally indicated at 19, divide the paddings into a longitudinal compartment 20, a pair of rear-right and rear-left compartments 22 and 24 and into a pair of pelvic bone engaging compartments 26 and 28. Compartments are utilized to ensure that the material 16 within each will not squeeze or creep to other areas when subjected to certain stresses.

A conventional bicycle seat is indicated by tne numeral 30. This seat has a relatively large trailing portion 32 leading to a narrow narrow leading portion 34. About the rear of the pad, a clip means 36 is secured having an end to snap under the seat member 30. This clip acts in combination with a woven elastic band 37 at the front of the pad, to secure the padding to the seat.

Below and above the polyethylene layers 14 and 16 are a pair of flexible leather-like sheets 40 and 42 which cover the relatively poor wearing polyethylene containers. This outer layer can be leather or any comfortable, flexible plastic such as polyurethane or nylon. The layers 40 and 42 are stitched intermediate the sides of the heat seal areas 18 and 19. It is important that the stitching take place intermediate the edges of the heat seals or leakage of oil from the thixotropic or dilatant material will take place.

The above description discloses a seat pad that is fastened to a conventional seat. It should be understood that the invention encompasses a bicycle seat unit wherein the pad is affixed by adhesive or the like directly to a metallic or plastic seat frame.

In one method of making a seat, a compartmentalized container of polyethylene and polyurethane is made with an absence of padding in at least several of the compartments. This unit is affixed to a seat in the conventional manner. The compartments which are void of padding are equipped with a tubular stem 46 adapted to receive pressurized foam rubber. The bike owner or user sits on the seat in his normal riding fashion and foam rubber is injected into these compartments until a minimum thickness of at least ⅜ inch is reached. This minimum thickness area will normally fall in the area where the pelvic bones of the user engage the pad. In practice, a desirable seat has been made with compartments 20, 22, and 24 being filled with a conventional padding material and wherein compartments 26 and 28, those which engage the pevic vone, are injected with the foam material.

In a general manner, while there has been disclosed an effective and efficient embodiment of the invention, it should be well understood that the invention is not limited to such an embodiment, as there might be changes made in the arrangement, disposition, and form of the parts without departing from the principle of the presnet invention as comprehended within the scope of the accompanying claims.

I claim:

1. An improved bicycle seat pad for providing proper accommodation for the pelvic bone of the user, said seat pad having a narrow leading end and a wider trailing end, said improvement comprising,
    a container having the general shape of said seat,
    means for dividing said container into a plurality of compartments, a padding in each of said compartments, said padding being of a high viscosity substance having a yield point of at least four grams per square centimeter and a viscosity between about 100,000 and about 40,000 poises at 0°F and 80°F, and wherein said plurality of compartments include a central compartment extending substantially from said narrow leading end to said wider trailing end and at least a first and second compartment intermediate said leading and trailing ends and on opposite sides of said central compartment.

2. The invention of claim 1 wherein said central compartment is relatively wide at the leading end and relatively narrow at the trailing end and wherein said first and second compartments are each further subdivided into a pair of compartments of substantially the same volume and area.

3. The invention of claim 1 wherein said padding is surrounded by a polyethylene bag, said bag being formed of an upper and lower sheet of polyethylene having the general shape of said seat, and seals of substantial thickness located between said compartments and about the peripheries of said sheets for sealing them together.

4. The invention of claim 3 wherein said container further includes a leather-like outer cover about all of said bags.

5. The invention of claim 4 wherein clip means secured to said cover secure said container to said seat.

6. The invention of claim 1 wherein said improved bicycle seat pad is an integral part of said bicycle seat.

* * * * *